(12) United States Patent
Duerk et al.

(10) Patent No.: US 8,112,564 B2
(45) Date of Patent: Feb. 7, 2012

(54) HARD DISK DRIVE STAGGERED SPIN-UP MECHANISM

(75) Inventors: Vicky Duerk, Shrewsbury, MA (US); Pak-lung Seto, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 1708 days.

(21) Appl. No.: 11/168,782

(22) Filed: Jun. 28, 2005

(65) Prior Publication Data

US 2006/0294269 A1    Dec. 28, 2006

(51) Int. Cl.
*G06F 13/12* (2006.01)
*G06F 12/00* (2006.01)
(52) U.S. Cl. .......................... 710/62; 711/114
(58) Field of Classification Search ............... 710/62; 711/114
See application file for complete search history.

(56) References Cited

U.S. PATENT DOCUMENTS

| | | | |
|---|---|---|---|
| 4,592,078 A * | 5/1986 | Yamada | 377/52 |
| 5,287,025 A * | 2/1994 | Nishimichi | 327/156 |
| 6,668,305 B1 | 12/2003 | Henriquez | |
| 2003/0115413 A1 * | 6/2003 | Wood et al. | 711/114 |
| 2004/0025070 A1 | 2/2004 | Yuan | |

FOREIGN PATENT DOCUMENTS

WO    WO 03/052758    6/2003

OTHER PUBLICATIONS

OEM Hard Disk Drive Specification for DCAS-34430/DCAS-32160, IBM, 1996, Revision 1.2, 26-32.*
PCT Search Report, PCT/US2006/025470, mailed Nov. 2, 2006.
"Office Action for Chinese Patent Application No. 200680023002.6", (Jan. 18, 2011), Whole Document.
"Office Action for Chinese Patent Application No. 200680023002.6", (Sep. 15, 2010), Whole Document.
"Office Action for European Patent Application No. 06785901.7-1232 mailed Jul. 7, 2008", (7/7/02008), Whole Document.
"PCT IPRP, PCT/US2006/025470 mailed Jan. 17, 2008", Whole Document.
"PCT Search Report and Written Opinion of the ISA, PCT/US2006/025470 mailed Nov. 21, 2006", Whole Document.

* cited by examiner

*Primary Examiner* — Henry Tsai
*Assistant Examiner* — Hyun Nam
(74) *Attorney, Agent, or Firm* — Blakely, Sokoloff, Taylor & Zafman LLP

(57) ABSTRACT

According to one embodiment, a host bus adapter (HBA) is disclosed. The HBA includes one or more link layer engines, one or more ports, each of the one or more ports associated with one of the one or more link layer engines and token passing logic having a shift register associated with each of the one or more link layer engines. A first link layer engine enables a first storage device coupled to an associated port to spin-up whenever the first link layer engine detects that a first shift register has a first value.

17 Claims, 4 Drawing Sheets

HARD DISK DRIVE STAGGERED SPIN-UP MECHANISM

FIELD OF THE INVENTION

The present invention relates to computer systems; more particularly, the present invention relates to computer system interaction with hard disk drives.

BACKGROUND

Most of the power used by modern hard disk drives is consumed by the spindle motor. When the hard disk is initially started up, the motor may draw a peak level of power that is more than two times what it takes to keep the disk spinning. While in most cases even the peak start-up power usage is not substantial, there may be an issue when using multiple hard disks that attempt to spin-up simultaneously. Such an occurrence requires a sufficient power supply to withstand this initial demand.

As a solution to the above-described problem, staggered spin-up is implemented in systems where the host system may spin up the disk drives sequentially. Staggered spin-up significantly lowers design requirements and the cost of the power supply, and avoids overloading of the power supply, reducing the risk of damage to the power supply and the disk drives.

However, in a traditional host bus adapter (HBA), most of the physical layer (phy) reset sequence state machines are implemented in firmware, leaving staggered spinup a firmware task. The disadvantage of enabling firmware handle phy reset sequence and spin-up is that it adds real time handling requirement to the host CPU, thus slowing down the performance. Further, since host processors are moving further away from the control unit, putting more and more pressure on offloading part or all of the reset sequence state machines in hardware, making firmware implementation of staggered spin-up will become undesirable.

BRIEF DESCRIPTION OF THE DRAWINGS

The invention is illustrated by way of example and not limitation in the figures of the accompanying drawings, in which like references indicate similar elements, and in which.

DETAILED DESCRIPTION

A mechanism for the staggered spin-up of hard disk drives is described. In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
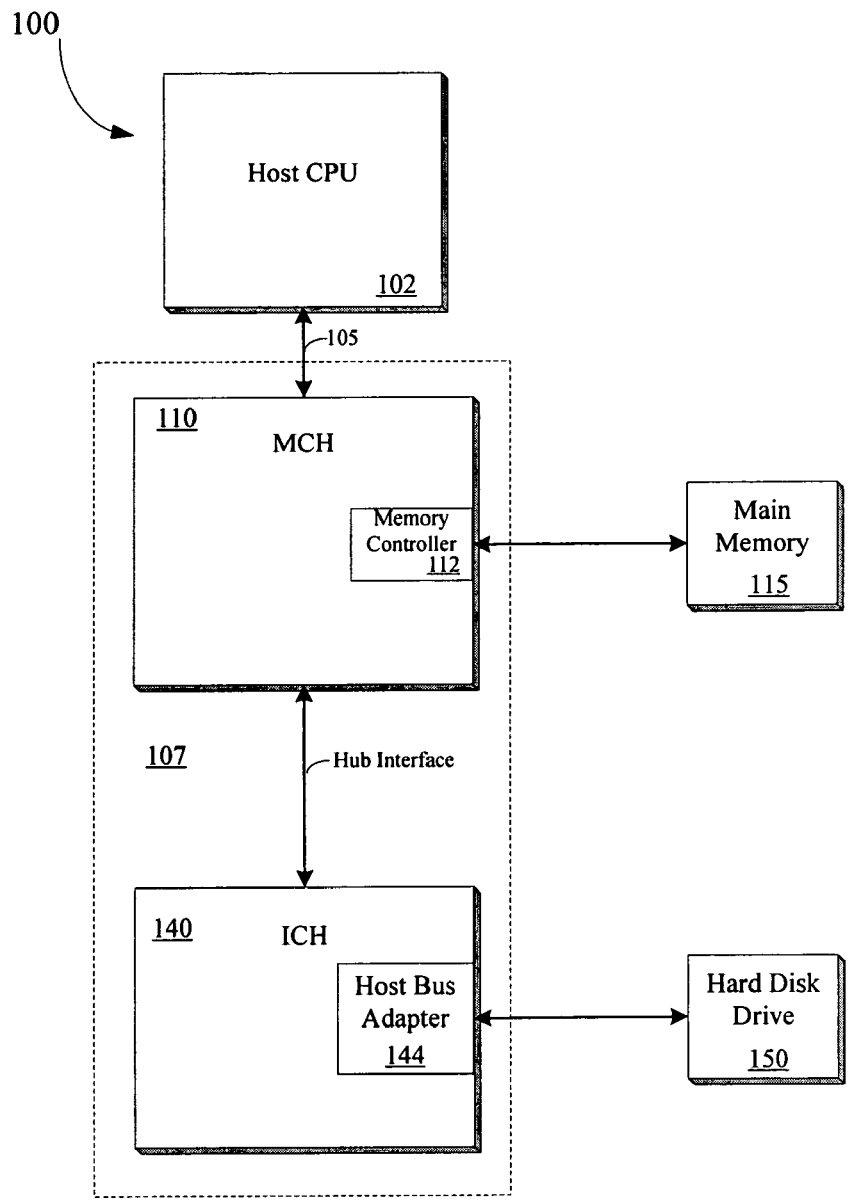
FIG. 1 is a block diagram of one embodiment of a computer system.

FIG. 1 is a block diagram of one embodiment of a computer system 100. Computer system 100 includes a central processing unit (CPU) 102 coupled to an interface 105. In one embodiment, CPU 102 is a processor in the Pentium® family of processors Pentium® IV processors available from Intel Corporation of Santa Clara, Calif. Alternatively, other CPUs may be used. For instance, CPU 102 may be implemented using multiple processing cores. In other embodiments, computer system 100 may include multiple CPUs 102

In a further embodiment, a chipset 107 is also coupled to interface 105. Chipset 107 includes a memory control hub (MCH) 110. MCH 110 may include a memory controller 112 that is coupled to a main system memory 115. Main system memory 115 stores data and sequences of instructions that are executed by CPU 102 or any other device included in system 100. In one embodiment, main system memory 115 includes dynamic random access memory (DRAM); however, main system memory 115 may be implemented using other memory types. Additional devices may also be coupled to interface 105, such as multiple CPUs and/or multiple system memories.

MCH 110 is coupled to an input/output control hub (ICH) 140 via a hub interface. ICH 140 provides an interface to input/output (I/O) devices within computer system 100. ICH 140 may support standard I/O operations on I/O busses such as peripheral component interconnect (PCI), accelerated graphics port (AGP), universal serial bus (USB), low pin count (LPC) bus, or any other kind of I/O bus (not shown).

According to one embodiment, ICH 140 includes a host bus adapter (HBA) 144. HBA 144 serves as a controller implemented to control access to one or more hard disk drives 150. In one embodiment, hard disk drive 150 is a serial SCSI (SAS) drive. However in other embodiments, hard disk drive 150 may be a serial ATA (SATA) drive. Nevertheless, HBA 144 is capable of controlling either a SAS or SATA device, as well as other device types.

For spin-up in a serial SCSI (SSP) drive, the host system issues a start-stop unit command (spinup enable) to enable the device for spin up. However, the device is not allowed to start spinning up until a primitive NOTIFY (enable spin-up) is received. In serial ATA (SATA) devices, a device automatically spins up when an out-of-band (OOB) sequence is complete.

A problem with spin-up of such devices is that each attached device spin-up is not controllable by computer system 100. For example, if the HBA has eight ports, and if all eight ports are active, with all attached devices located in the same enclosure, spinning up simultaneously requires a power supply that can handle eight times the peak current y at spin-up.

Figure 2:
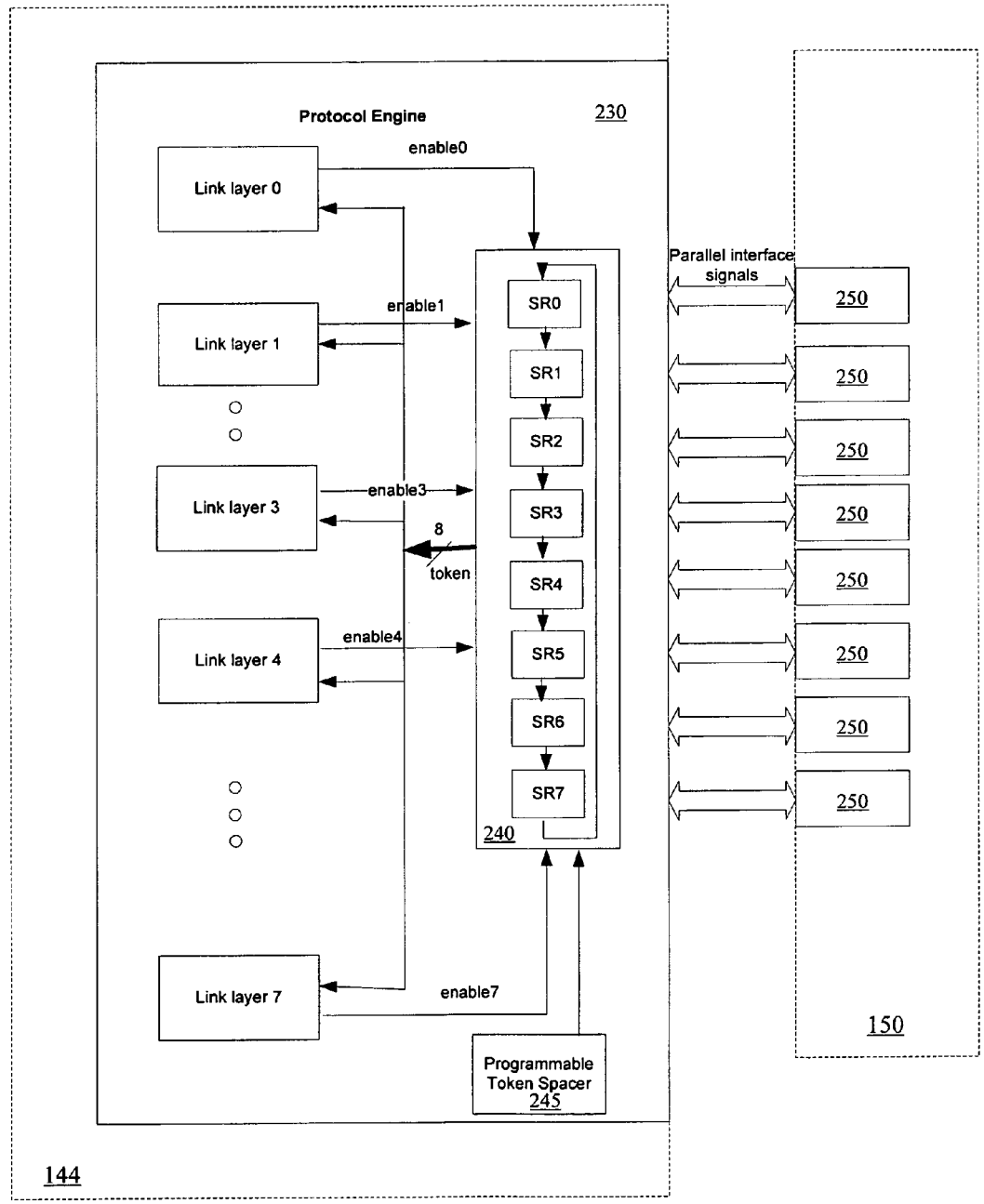
FIG. 2 illustrates one embodiment of a Host Bus Adapter coupled to hard disk drives.

According to one embodiment, a staggered spin-up mechanism is incorporated in the hardware of HBA 144 to enable disk drives coupled to HBA 144 to be started up sequentially. FIG. 2 illustrates one embodiment of HBA 144 coupled to hard disk drive 150. According to one embodiment, HBA 144 is coupled to eight storage devices 250 within hard disk drive 150 via eight ports.

HBA 144 includes a protocol engine 230, which represents a link layer to communicate with a SAS/SATA device. Protocol engine 230 includes link layer engines 0-7 corresponding to each of the eight ports, programmable token spacer 245 and token passing logic 240. The link layer engines controls communication for each operational SAS link. Such communication includes an identification sequence, connection management, and frame transmission requested by the port layer. In one embodiment, the link layer engines each include their own OOB speed negotiation logic.

Further, all eight of the engines communicate with token passing logic 240. Token passing logic 240 is a shift register with a default one hot encoded value on power up. According to one embodiment, the shift register includes registers SR0-SR7 corresponding to each link layer engine. Programmable token spacer 245 is a counter that may be custom programmed to a value that equals a time difference between the spin-ups of two adjacent devices.

In one embodiment, the minimum value should be set to the minimum spin-up time for the devices. Token spacer 245 operates as a shift enable signal to the shift register. The control signals that are passed from the link layer engines 0-7 to token passing logic 240 are: enable0-7.

According to one embodiment, a link layer engine transmits an enable signal to spin-up its respective device 250. The particular link layer initiates the transmission of the spin-up whenever the associated register in token passing logic 240 is a logic 1. For example, link layer engine 0 transmits enable0 whenever SR0 is a logic 1. Subsequently, a logic 0 is shifted to SR0 causing the logic 1 to be shifted to SR1, resulting in enable0 being deactivated and enable1 being transmitted to its corresponding device 250 for spin-up In a further embodiment, when a link is attached to an expander (not shown), no spin-up is necessary for that particular link because the expander will handle the staggered spin-up itself and will not forward any incoming Notify (enable spin-up) primitives. Therefore, when the link layer detects that the port is attached to an expander, or when it detects that no device is attached, the link layer will transmit a control signal to token control logic 240 to bypass the corresponding shift register component. In this case, NOTIFY primitive may not be sent by the link layer. In one embodiment, firmware may force to mask out a particular link by bypassing the corresponding shift register component. Token passing logic 240 will send one token to the link layer at a time, guaranteeing one spin-up at a time.

Figure 3A:
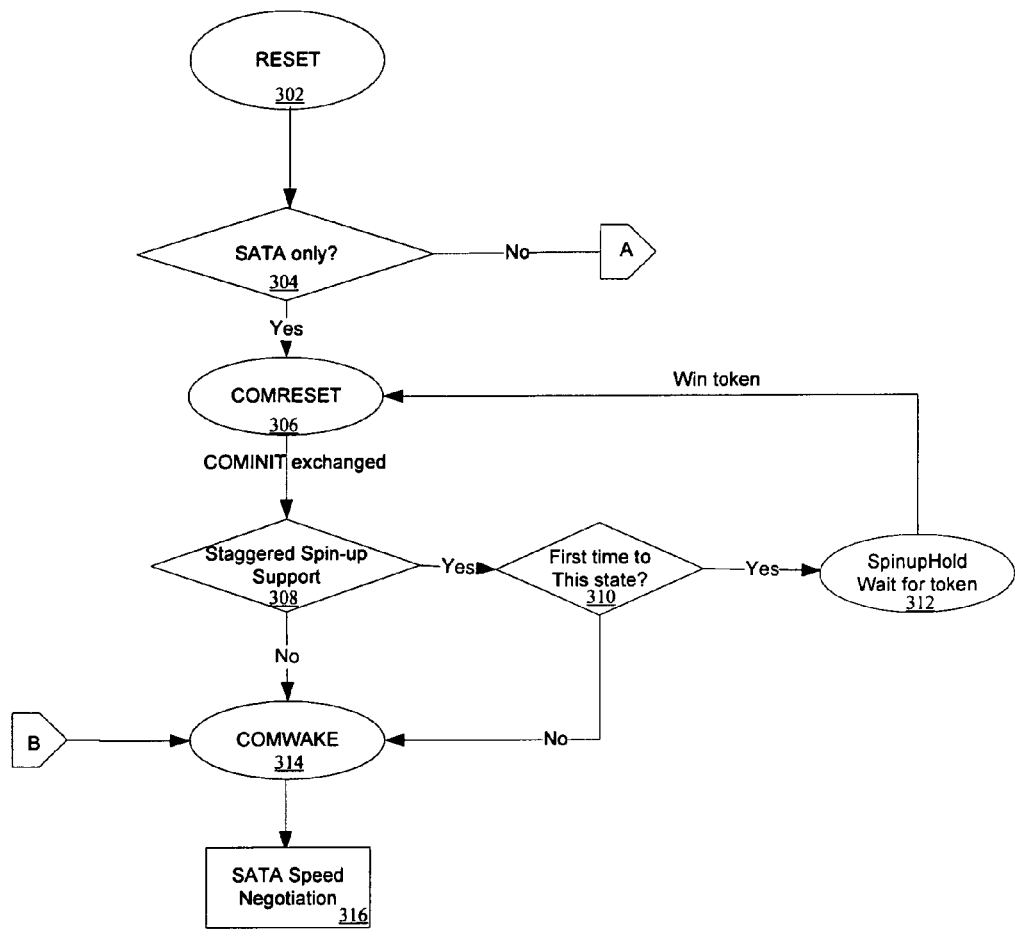
FIGS. 3A and 3B is a flow diagram illustrating one embodiment of the operation of staggered spin-up.
Figure 3B:
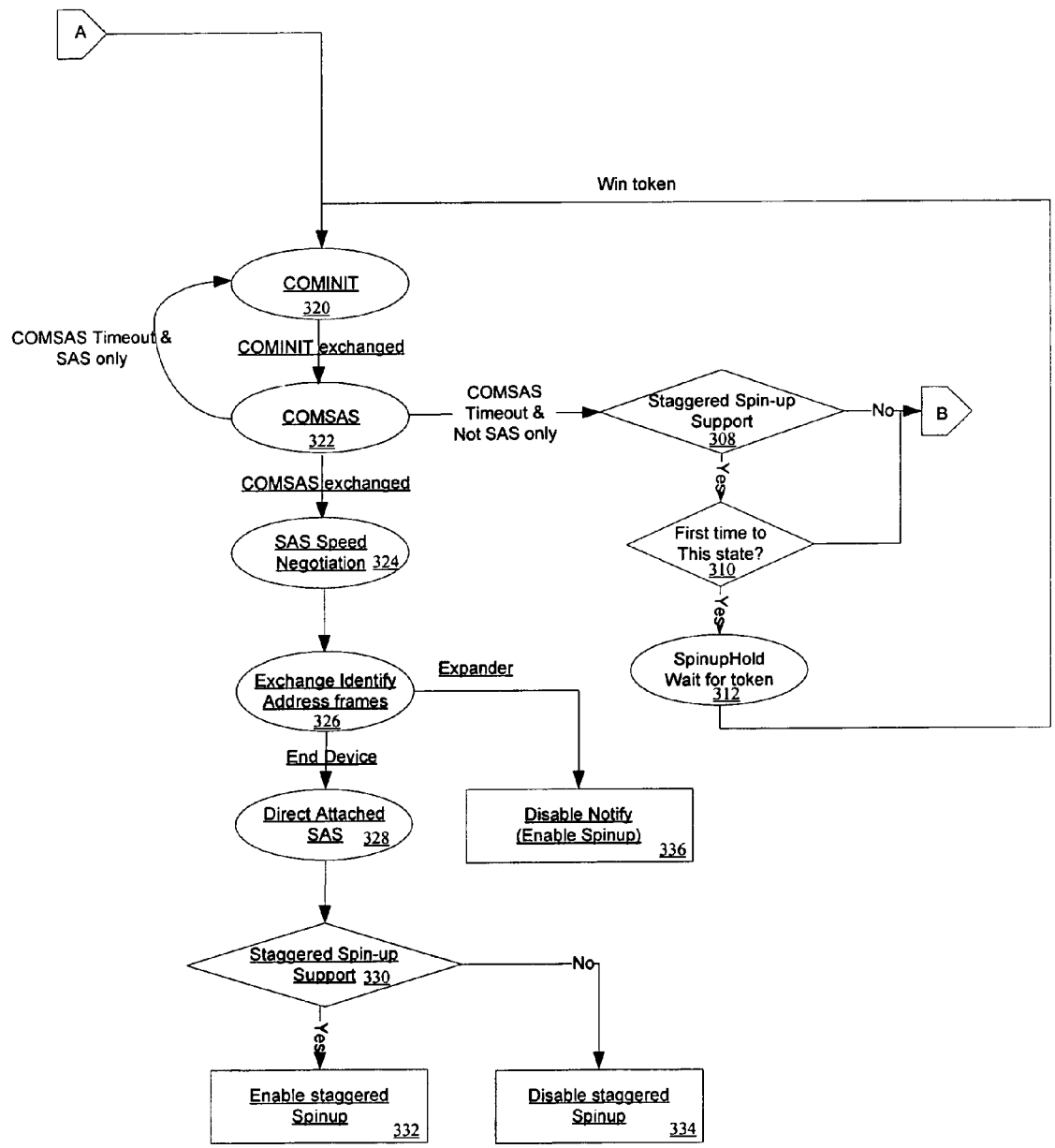

FIGS. 3A and 3B is a flow diagram illustrating one embodiment of a reset sequence at a link layer engine supporting staggered spin-up. Referring to FIG. 3A, the process begins in the reset state 302. At decision block 304, the link layer engine determines if it supports only an SATA mode. If so, the link layer engine enters a COMRESET state 306 where it waits for a COMINIT/COMRESET exchange.

At decision block 308, it is determined if staggered spin-up is supported. If staggered spin-up is supported, it is determined, at decision block 310, if this is the first time this state is entered. If so, the link layer engine enters SpinupHold state 312 to wait for the token. When a token is acquired, the link layer engine goes back to the COMRESET state 306.

If not the first time to enter this state, or staggered spin-up is not supported, the link layer engine goes to COMWAKE state 314. At processing block 316, the link layer engine allows reset of the OOB/Speed Negotiation to finish. The associated device then spins up automatically.

If at decision block 304, it is determined that not only SATA is supported, the link layer engine enters COMINIT state 320. Referring to FIG. 3B, a COMSAS state 322 is entered after COMINIT is exchanged. If COMSAS state 322 detects a timeout and SATA support is assumed, control is returned to decision block 308 where it is determined if staggered spin-up is supported (FIG. 3A).

If COMSAS state 322 detects that a timeout occurs and only SAS is supported, the engine link layer goes back to the COMINIT state 320. Otherwise COMSAS is exchanged and a SAS speed negotiation state 324 is entered. Subsequently, the engine link layer enters a state 326 where identify address frames are exchanged. If an expander is present, notify is disabled and spin-up is enabled, processing block 336.

Otherwise from state 326, the engine link layer enters a direct attached SAS state 328. At decision block 330, it is determined whether staggered spin-up is supported at the engine link layer. If supported, staggered spin-up is enabled, processing block 332. If staggered spin-up is enabled, the enable signal that goes to token control logic 240 gets set. NOTIFY primitive will be sent on this link. If not supported, staggered spin-up is disabled, processing block 334. If staggered spin-up is disabled, the control signal is cleared. The token control logic will bypass this node, resulting in no NOTIFY primitive being sent.

The above-described staggered spin-up mechanism greatly reduces power supply requirements. In addition, the mechanism provides a stand alone serial interface solution to support staggered spin-up power management and eliminates firmware control of staggered spin-up, which adds real time handling requirement for the host processor. Further, the mechanism eliminates the requirement of a local microprocessor at the HBA, which reduces the design cost to support staggered spin-up.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A host system comprising:
   a shift register having a plurality of registers; and
   a first link layer engine to transmit an enable signal to a first storage device to spin-up upon detecting that a first of the plurality of registers has a first value; and
   a second link layer engine to transmit an enable signal to a second storage device to spin-up upon detecting that a second of the plurality of registers has the first value;
   wherein the first register shifts the first value to the second register upon receiving a second value after a predetermined time interval.

2. The host system of claim 1 further comprising:
   a first port coupled to the first link layer engine and the first storage device; and
   a second port associated with the second link layer engine and the second storage device.

3. The host system of claim 2 wherein the second link layer engine disables the second storage device whenever detecting that the second shift register has the second value.

4. The host system of claim 2 further comprising a token spacer to provide the value to the shift register.

5. The host system of claim 4 wherein the value represents a time difference between the spin-up for the first device and the spin-up for the second device.

6. The host system of claim 4 wherein the value is programmable.

7. The host system of claim 2 wherein a third link layer engine transmits a control signal to the token passing logic to bypass a third shift register if a third port is coupled to an expander.

8. A method comprising:
a first link layer engine within a host system detecting a first value at a first shift register associated with the first link layer engine;
transmitting a first enable signal to a first storage device associated with the first link layer engine to initiate spin-up of the first device;
receiving a second value at the first register after a predetermined time interval;
the first register shifting the first value to a second register upon receiving a second value;
a second link layer engine detecting a second value at a second shift register associated with the second link layer engine; and
transmitting a second enable signal to a second storage device associated with the second link layer engine to initiate spin-up of the second device.

9. The method of claim 8 further comprising transmitting a value indicating a time difference between the spin-up for the first device and the spin-up for the second device.

10. The method of claim 8 wherein the value is programmable.

11. The method of claim 8 further comprising:
a third link layer engine detecting an expander coupled to a port associated with the third link layer engine; and
third link layer engine transmitting a control signal to bypass a third shift register.

12. A system comprising:
one or more storage devices; and
a host system, coupled to the one or more storage devices, having:
a shift register having a plurality of registers; and
a first link layer engine to transmit an enable signal to a first storage device to spin-up upon detecting that a first of the plurality of registers has a first value; and
a second link layer engine to transmit an enable signal to a second storage device to spin-up upon detecting that a second of the plurality of registers has the first value;
wherein the first register shifts the first value to the second register upon receiving a second value after a predetermined time interval.

13. The system of claim 12 wherein the host system further includes:
a first port coupled to the first link layer engine and the first storage device; and
a second port associated with the second lurk layer engine and the second storage device.

14. The system of claim 12 wherein the host system further comprising a token spacer to provide a value to the shift register.

15. The system of claim 13 wherein the host system further comprises a third link layer engine to transmit a control signal to the token passing logic to bypass a third shift register if a third port is coupled to an expander.

16. The system of claim 14 wherein the value is programmable.

17. The system of claim 14 wherein the value represents a time difference between the spin-up for the first device and the spin-up for the second device.

* * * * *

UNITED STATES PATENT AND TRADEMARK OFFICE
CERTIFICATE OF CORRECTION

| | | |
|---|---|---|
| PATENT NO. | : 8,112,564 B2 | Page 1 of 1 |
| APPLICATION NO. | : 11/168782 | |
| DATED | : February 7, 2012 | |
| INVENTOR(S) | : Duerk et al. | |

It is certified that error appears in the above-identified patent and that said Letters Patent is hereby corrected as shown below:

In the Claims

In column 6, at line 15 delete, "second lurk" and insert -- second link --.

Signed and Sealed this
Eleventh Day of March, 2014

Michelle K. Lee
*Deputy Director of the United States Patent and Trademark Office*